(12) United States Patent
Tanigawa

(10) Patent No.: US 8,122,192 B2
(45) Date of Patent: Feb. 21, 2012

(54) DATA PROCESSING APPARATUS AND DATA PROCESSING METHOD

(75) Inventor: Mitsunobu Tanigawa, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 165 days.

(21) Appl. No.: 11/410,931

(22) Filed: Apr. 26, 2006

(65) Prior Publication Data
US 2006/0248263 A1 Nov. 2, 2006

(30) Foreign Application Priority Data

Apr. 28, 2005 (JP) .................................. 2005-131212
Mar. 1, 2006 (JP) .................................. 2006-054279

(51) Int. Cl.
*G06F 12/00* (2006.01)
(52) U.S. Cl. ........ 711/117; 711/118; 711/128; 711/130; 711/131; 711/213
(58) Field of Classification Search .................. 711/117, 711/118, 128, 130, 131, 213
See application file for complete search history.

(56) References Cited

U.S. PATENT DOCUMENTS

| | | | | | |
|---|---|---|---|---|---|
| 4,413,317 | A | * | 11/1983 | Swenson | 711/114 |
| 4,445,174 | A | * | 4/1984 | Fletcher | 711/121 |
| 6,973,541 | B1 | * | 12/2005 | Williams et al. | 711/135 |
| 2003/0110360 | A1 | * | 6/2003 | Nakajima | 711/152 |

FOREIGN PATENT DOCUMENTS

| | | |
|---|---|---|
| EP | 0 404 128 B1 | 9/1997 |
| JP | 11-175398 A | 7/1999 |
| JP | 11-306029 A | 11/1999 |
| JP | 2004-5287 A | 1/2004 |

* cited by examiner

*Primary Examiner* — Midys Rojas
(74) *Attorney, Agent, or Firm* — Sughrue Mion, PLLC

(57) ABSTRACT

The data processing apparatus according to an embodiment of the present invention includes: a first processor; a second processor; and an external RAM to/from which the first processor writes/reads data, the first processor including a cache memory for storing data used in the first processor in association with an address on the external RAM, and the data being written to the cache memory by the second processor not through the external RAM.

24 Claims, 14 Drawing Sheets

DATA PROCESSING APPARATUS AND DATA PROCESSING METHOD

BACKGROUND OF THE INVENTION

1. Field of the Invention

The present invention relates to a data processing apparatus and a data processing method. In particular, the invention relates to a data processing apparatus including plural processors, and a data processing method used therefor.

2. Description of Related Art

In recent years, a chip prepared by mounting plural processor core modules, a peripheral RAM, and a peripheral functional module on one LSI chip has come into widespread use. Further, along with the advanced functionality, the above processor core module incorporates a program cache memory in many cases. Providing the program cache memory that operates at higher speeds than general RAMs increases a processing speed of the processor. Japanese Unexamined Patent Application Publication No. H11-306029 discloses an interrupting method that issues an interruption request to the processor having a cache memory. With this method, a program for executing an interruption processing is transferred from a main memory to the cache memory at a predicted timing.

Incidentally, the simplest solution to a problem of how to run a program code that is beyond a program memory capacity of the processor is to increase the program memory capacity of the processor or a size of the peripheral RAM.

Meanwhile, there is a demand for the LSI chip to reduce a size of an installed processor core or RAM from the viewpoints of yield and packaging area. In addition, the processor core module to be installed is provided as a reusable part. Thus, it is difficult for development of processor cores to change a program memory capacity from one LSI chip to another in the light of cost.

Against this background, required is a technique of executing a program code that is beyond an internal program memory capacity without changing the hardware configuration such as increasing the program memory capacity. That is, in some data processing apparatuses having a processor, it is desired that the internal program memory capacity be smaller than that of the program to be executed.

Referring to FIG. 12, the system configuration of a conventional data processing apparatus having plural processors is described. FIG. 12 is a block diagram of the system configuration of the conventional data processing apparatus. The system is composed of a processor (1) 600, a processor (2) 620, and an external RAM 650. The processor (1) 600 and the external RAM 650 are connected through a memory bus, and the processor (2) 620 and the external RAM 650 are connected through a memory bus. The processor (2) 620 can send an interruption signal 640 to the processor (1) 600.

The processor (1) 600 includes an internal program memory 613 for storing a program, and a program cache memory 612 for storing a program code that is fetched through program fetch access to the external RAM 650. A memory controller 611 controls a process of writing/reading a program code to/from the program cache memory 612, the internal program memory 613, and the external RAM 650. An arithmetic logical unit 610 controls a memory controller to read the program code stored in the internal program memory 613 or the like and execute a program.

The processor (2) 620 includes an internal program memory 632 for storing a program. A memory controller 631 controls a process of writing/reading a program code to/from the internal program memory 632 and the external RAM 650. An arithmetic logical unit 630 controls a memory controller 631 to read the program code stored in the internal program memory 632 or the like and execute a program.

FIG. 13 shows a memory map of the processor (1) 600 and the processor (2) 620. The external RAM 650 is mapped to the memory map of each of the processor (1) 600 and the processor (2) 620. That is, an external RAM 700 is mapped to the processor (1) memory map, and an external RAM 711 is mapped to the processor (2) memory map. Thus, the processor (1) 600 and the processor (2) 620 can arbitrarily read/write data or the like to/from the external RAM 650. In addition, the processor (2) program code that is beyond the capacity of the internal program memory 613 of the processor (1) 600 is stored in a processor (1) program code table data 710 mapped to the memory map of the processor (2) 620.

Referring to FIG. 11, an operation of a general program cache memory is described. FIG. 11 shows the configuration of the program cache memory. When the processor executes a program fetch access to the external RAM 650, a hardware component automatically copies the fetched program code to one of program cache memory areas 510, 511, 512, and 513. During the coping operation, the fetched program code and adjacent program codes are collectively copied by L bytes. Simultaneously, a hardware component records which address of an external RAM a program code is copied from, with respect to program cache memory tags 530 to 533 which manages a memory area 500 as a copy destination.

FIGS. 14 and 15 are flowcharts of a conventional program. FIG. 14 is a flowchart of an operation of the processor (1) 600, and FIG. 15 is a flowchart of an operation of the processor (2) 620. First, the processor (2) 620 starts copying program codes (codes that are beyond the capacity of the internal program memory 613 of the processor (1) out of the processor (1) program codes) to the external RAM 711 (step S811). In this way, the external RAM 650 stores the above program codes. After the completion of copying a program code (table data 710), the processor (2) 620 notifies the processor (1) 600 of the completion of writing the program code (table data 710) by using the interruption signal 640 (step S812). The processor (1) 600 waits for the interruption signal 640 to input in step 801, and is shifted to a normal program execution state as a result of the signal input (step 802). After that, if the processor (1) 600 executes the program codes on the external RAM 650, the executed program codes are sequentially copied to the program cache memory 612 from an external RAM 650 through the hardware operation.

In the related art, the external RAM 650 stores the program codes that would overflow the internal program memory 613 of the processor (1). As a result, there arises a problem in that the external RAM 650 cannot be used for other purposes, and another RAM should be added for the other purposes. This problem is caused as follows.

Unless all of the processor (1) program codes stored in the external RAM 650 are copied to the processor (1) program cache memory 612, there is a possibility that the processor (1) memory controller 611 executes a fetch access. Thus, data stored in the external RAM 650 cannot be rewritten in order not to damage the processor (1) program code. Here, the processor (1) 600 needs to completely execute the program codes on the external RAM 650 for copying all of the stored data from the external RAM 650 to the processor (1) program cache memory 612. That is, it is necessary to read all of the program codes that cannot be stored in the internal program memory 613, and write the read codes to the program cache memory 612.

However, it is conceivable that there are infrequently-executed program codes in view of a conditional branching structure of general program codes, and the execution conditions. Thus, it is difficult to determine whether or not the processor (1) 600 completely executes the program codes. That is, it is difficult to determine whether or not all the program codes on the external RAM 650 are copied to the processor (1) program cache memory 612. Accordingly, the processor (1) program codes stored in the external RAM 650 cannot be rewritten. As a result, apart of the external RAM 650 is occupied for storing the program codes. In this case, it is necessary to store all the program codes that cannot be stored in the internal program memory 613, in the external RAM 650. This results in a problem that a free space of the external RAM 650 is reduced, and the external RAM capacity cannot be reduced to a predetermined capacity or smaller.

SUMMARY OF THE INVENTION

A data processing apparatus according to an aspect of the present invention includes: a first processor; a second processor; and an external RAM to/from which the first processor writes/reads data, the first processor including a cache memory for storing data used in the first processor in association with an address on the external RAM, and the data being written to the cache memory by the second processor not through the external RAM. Hence, a free space of the external RAM can be increased, and the external RAM can be made compact.

According to a second aspect of the present invention, a data processing method used in a data processing apparatus including a first processor, a second processor, and an external RAM to/from which the first processor writes/reads data, includes: associating a cache memory provided to the first processor with an address on the external RAM; and writing data to the cache memory by using the second processor not through the external RAM. Hence, a free space of the external RAM can be increased, and the external RAM can be made compact.

According to the present invention, it is possible to provide a data processing apparatus capable of reducing a capacity of an external memory provided outside a processor, and data processing method used therefor.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

Figure 1:
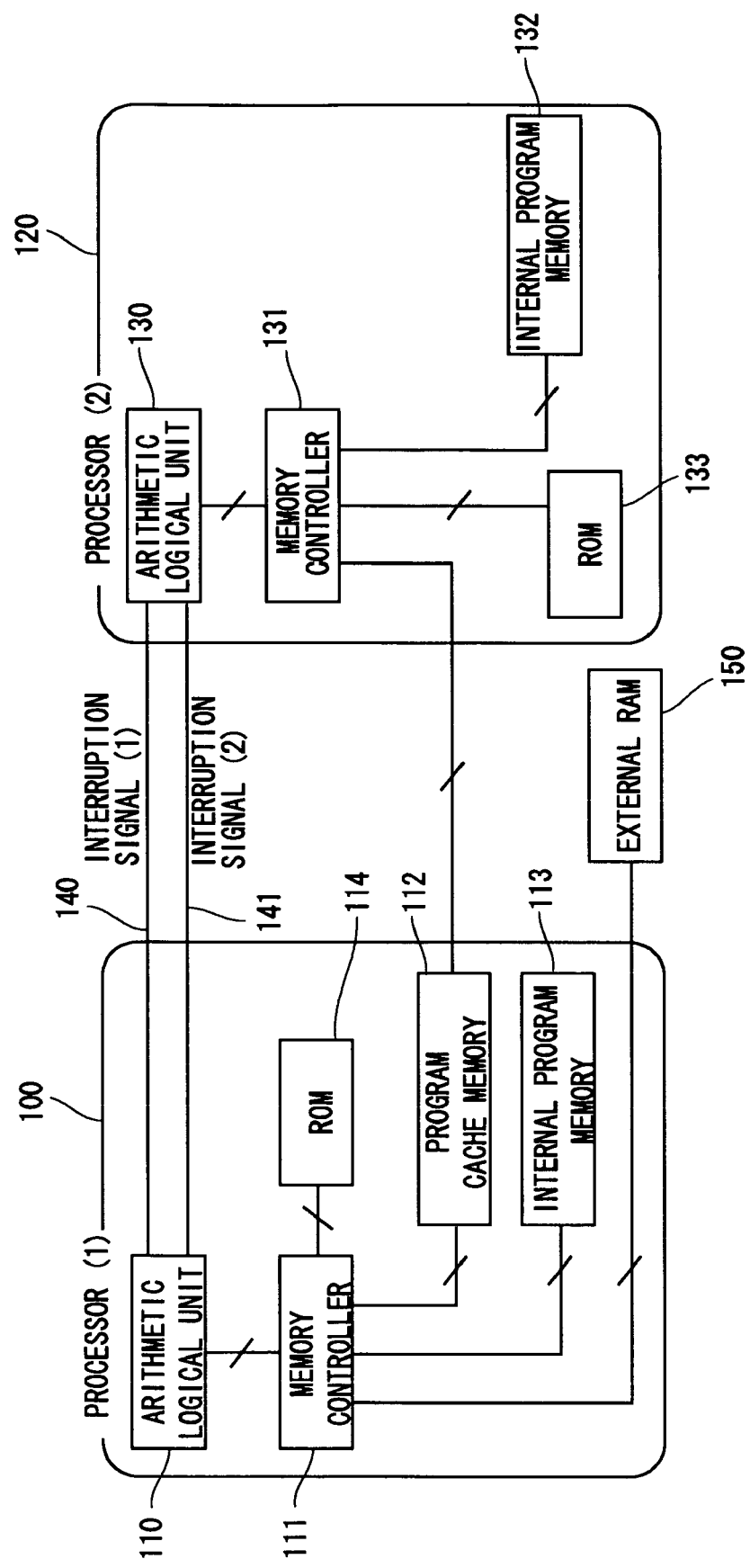
FIG. 1 is a block diagram of the system configuration of a data processing apparatus according to an embodiment mode of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Hereinafter, embodiments of the present invention are described. The following description is given for explaining the embodiments of the present invention, and is not construed as limiting the present invention to the following embodiments. For clear explanation, the following description is appropriately omitted or simplified. Those skilled in the art could easily execute addition, change, and exchange of components of the following embodiments without departing from the scope of the present invention. Throughout the accompanying drawings, the same components are denoted by like reference numerals, and their description is omitted if not necessary.

Referring to FIG. 1, the system configuration of a data processing apparatus according to the present invention is described. FIG. 1 is a block diagram showing the system configuration of the data processing apparatus according to the present invention. The data processing apparatus according to present invention is composed of an LSI including a first processor (1) 100 and a second processor (2) 120. The data processing apparatus includes the processor (1) 100, the processor (2) 120, and an external RAM 150 provided outside the processor (1) 100 and the processor (2) 120. The processor (1) 100 and the processor (2) 120 are connected through a memory bus, and the processor (1) 100 and the external RAM 150 are connected through a memory bus. The processor (1) 100 can send an interruption signal (1) 140 to the processor (2) 120, and the processor (2) 120 can send an interruption signal (2) 141 to the processor (1) 100.

The processor (1) includes an arithmetic logical unit 110, a memory controller 111, a program cache memory 112, an internal program memory 113, and a ROM 114. The memory controller 111 is connected with the program cache memory 112, the internal program memory 113, and the external RAM 150 via bus lines. The memory controller 111 controls an operation of reading program codes from the program cache memory 112, the internal program memory 113, and the external RAM 150 or an operation of writing data thereto. The arithmetic logical unit 110 and the memory controller 111 are connected via bus lines. The arithmetic logical unit 110 controls the memory controller 111 to read program codes stored in the internal program memory 113 and so on, and execute the programs. Then, the memory controller 111 writes the computation result of the arithmetic logical unit 110 into the external RAM 150. Thus, a predetermined data processing is executed in accordance with the execution program. The provision of the program cache memory 112 operable at higher speeds than the internal program memory 113 increases a processing speed. The ROM 114 stores an initializing program for initializing the program cache memory 112. This initializing program is described later.

The processor (2) 120 includes an arithmetic logical unit 130, a memory controller 131, an internal program memory 132, and a ROM 133. The arithmetic logical unit 130 is connected with the memory controller 131 via bus lines. The memory controller 131 is connected with the internal program memory 132 via bus lines. The arithmetic logical unit 130 executes computation based on the program code read by the memory controller 131 from the internal program memory 132. Further, the memory controller 131 is connected with the program cache memory 112 of the processor (1) 100 via memory bus lines. The memory controller 131 writes a program code to the program cache memory 112 of the processor (1). The ROM 133 stores an execution program to be executed by the processor (1). The execution program to be executed by the processor (1) that is stored in the ROM 133 is written to the internal program memory 113 of the processor (1) 100, for example, through a direct memory access (DMA).

Figure 2:
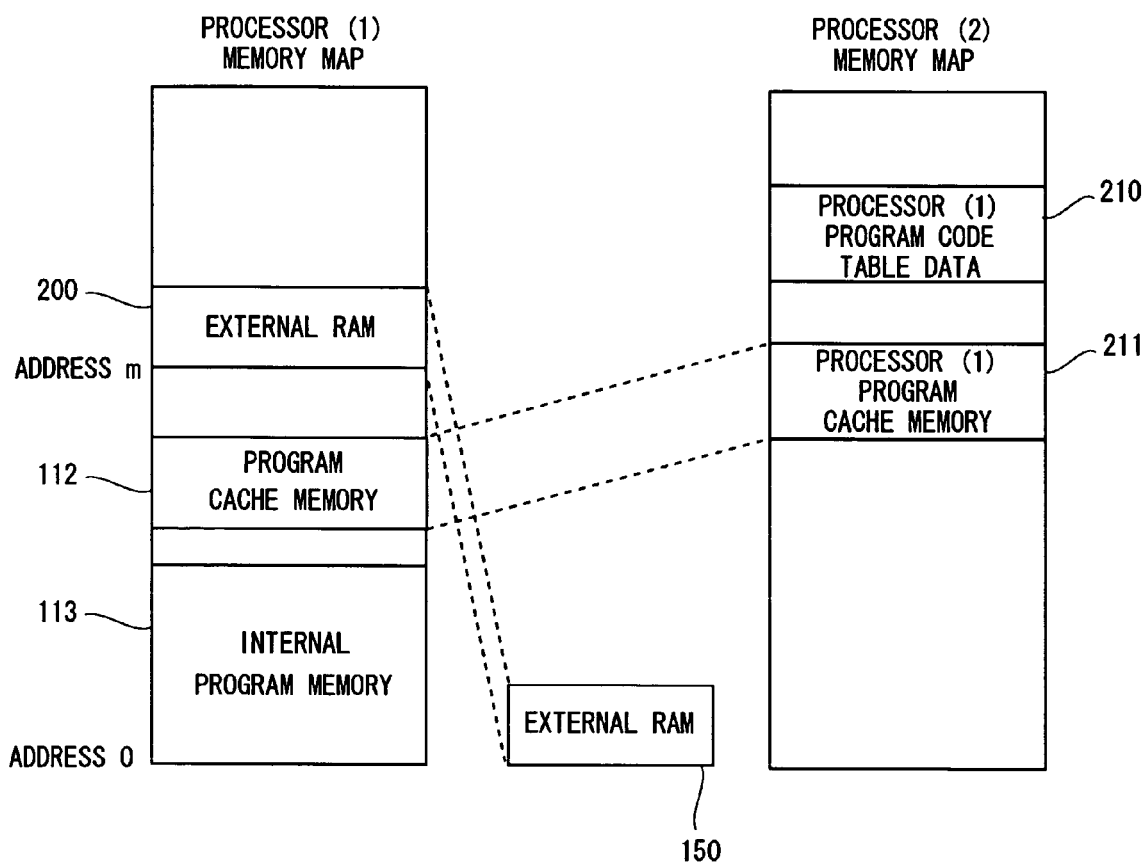
FIG. 2 shows a memory map of the data processing apparatus according to the embodiment mode of the present invention.

FIG. 2 shows memory maps of the processor (1) and the processor (2). The internal program memory 113 is mapped to the memory map of the processor (1) 100. Further, the external RAM 150 is mapped to the processor (1) memory map, and can be arbitrarily read from/written to the processor (1) 100. The program cache memory 112 of the processor (1) 100 is mapped to the processor (2) memory map. That is, the processor (2) memory map includes a program cache memory 211. Hence, data on the program cache memory 112 can be arbitrarily read from/written to the processor (2) 120. Moreover, some processor (1) program codes that would overflow the internal program memory 113 of the processor (1) are stored as table data 210 on the memory map of the processor (2) 120. That is, some program codes out of the execution program stored in the ROM 133, which could not be written to the internal program memory 113, are mapped to the memory map as the table data 210. The memory controller 111 executes a program code or data reading/writing operation in accordance with the memory map.

Figure 11:
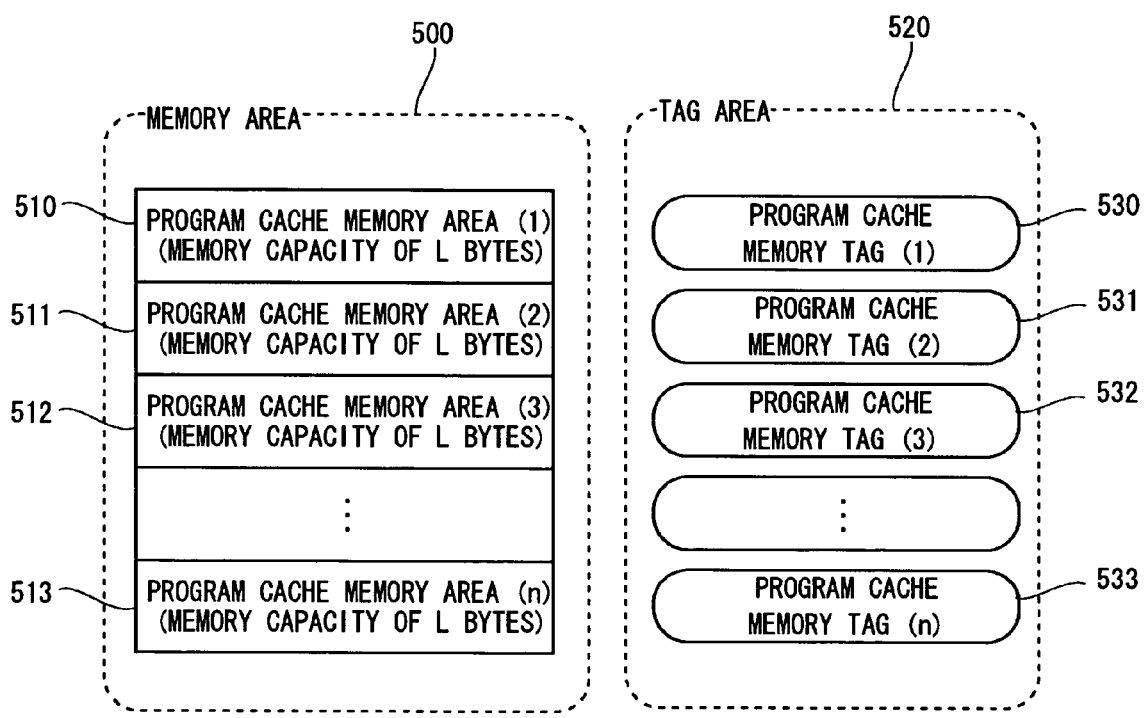
FIG. 11 shows the configuration of a general program cache memory.
Figure 12:
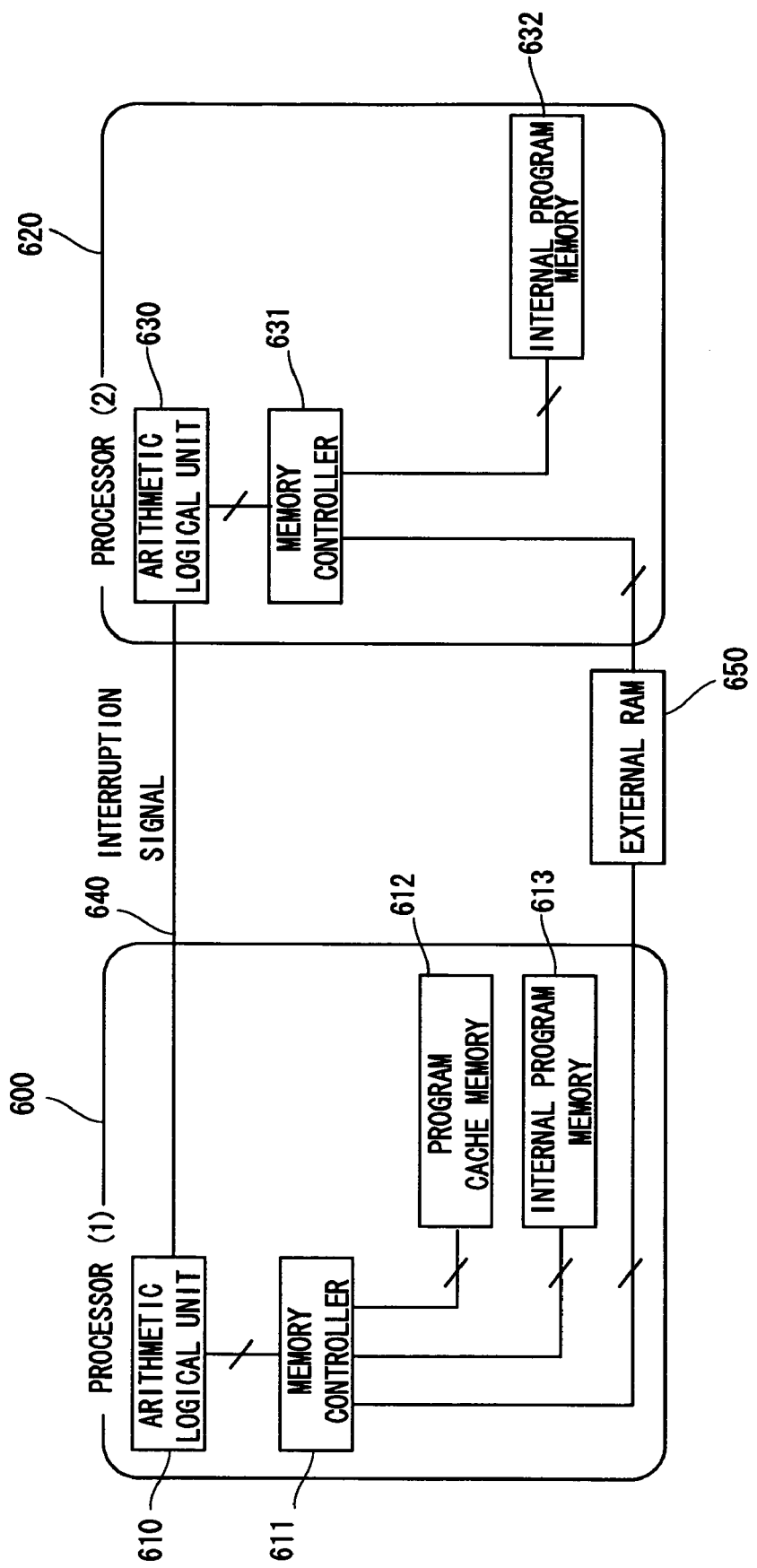
FIG. 12 is a block diagram showing the system configuration of a conventional data processing apparatus.
Figure 13:
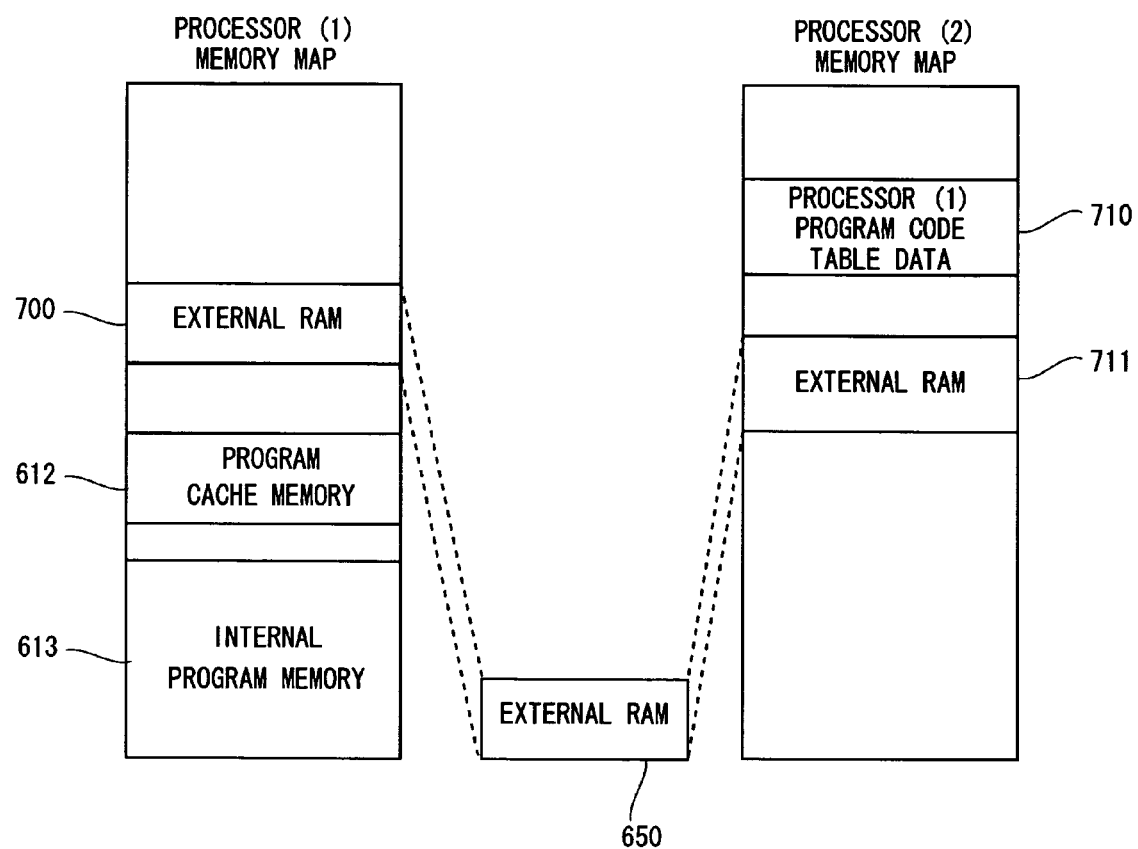
FIG. 13 shows a memory map of the conventional data processing apparatus.
Figure 14:
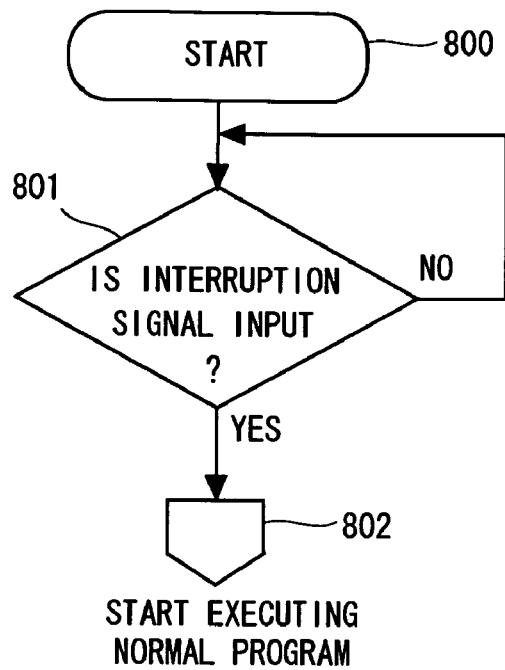
FIG. 14 is a flowchart of a procedure of initializing a program cache memory of the conventional data processing apparatus.
Figure 15:
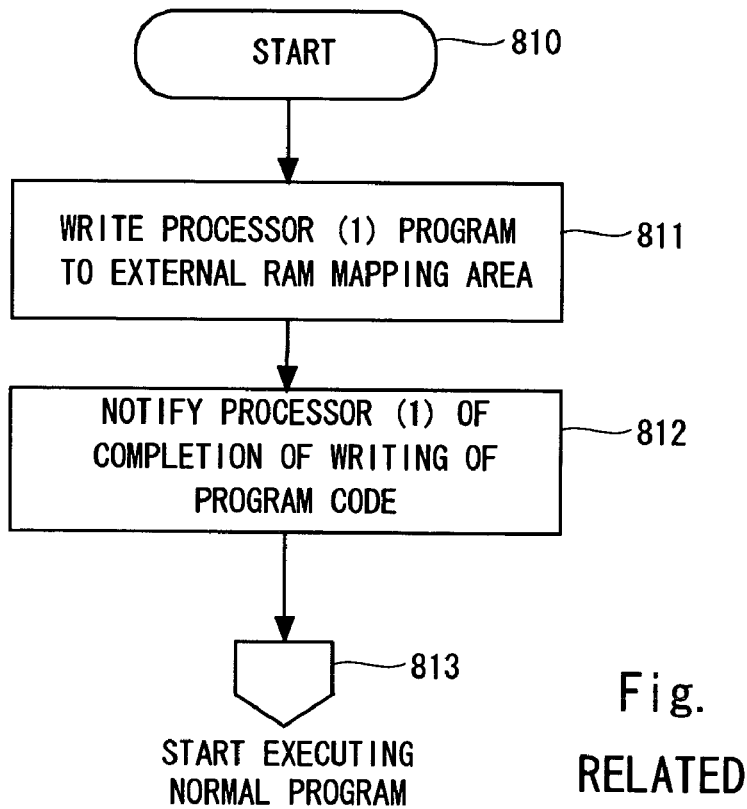
FIG. 15 is a flowchart of a procedure of initializing the program cache memory of the conventional data processing apparatus.

Referring next to FIG. 11, the configuration of the program cache memory 112 of the processor (1) 100 is described. FIG. 11 is a block diagram showing the configuration of the program cache memory 112. In general, the program cache memory 112 includes a memory area 500 for storing program codes, and a tag area 520 for managing the memory area. The above memory area 500 is divided into n small program cache memory areas 510, 511, 512, and 513. The program cache memory areas 510 to 513 have the same size, that is, L bytes. The tag area 520 for managing the program cache memory areas 510, 511, 512, and 513 obtained by dividing the memory area 500 is also divided into n program cache memory tags 530, 531, 532, and 533. The memory areas and the memory tags operate in pairs like a pair of the program cache memory area 510 and the program cache memory tag 530, and a pair of the program cache memory area 511 and the program cache memory tag 531. That is, the program cache memory areas 510 to 513 are associated with the program cache memory tags 530 to 533 in a one-to-one correspondence. For example, the processor (1) 100 rewrites the program code of the program cache memory area 510 and also rewrites the program cache memory tag 530 corresponding to the program cache memory area 510. AN address of a program code stored in the program cache memory areas 510 to 513 on the external RAM is written to the program cache memory tags 530 to 533. That is, the program cache memory tags 530 to 533 store the address of the program code written to the program cache memory areas 510 to 513 on the external RAM 150. Hence, the program cache memory 112 stores the program codes and copy source addresses of the program codes on the external RAM in a one-to-one correspondence.

Figure 3:
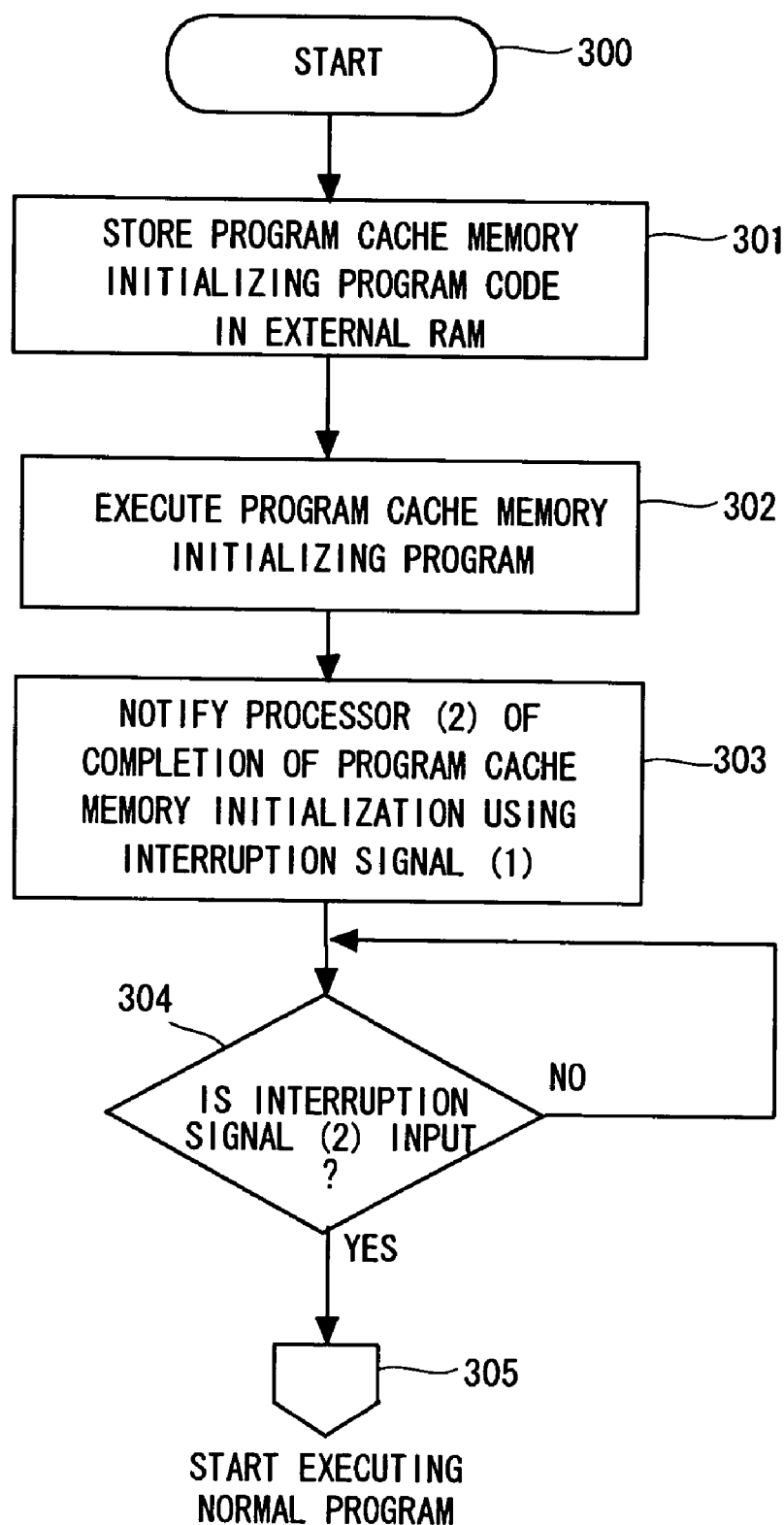
FIG. 3 is a flowchart showing a procedure of initializing a program cache memory of the data processing apparatus according to the embodiment mode of the present invention.
Figure 4:
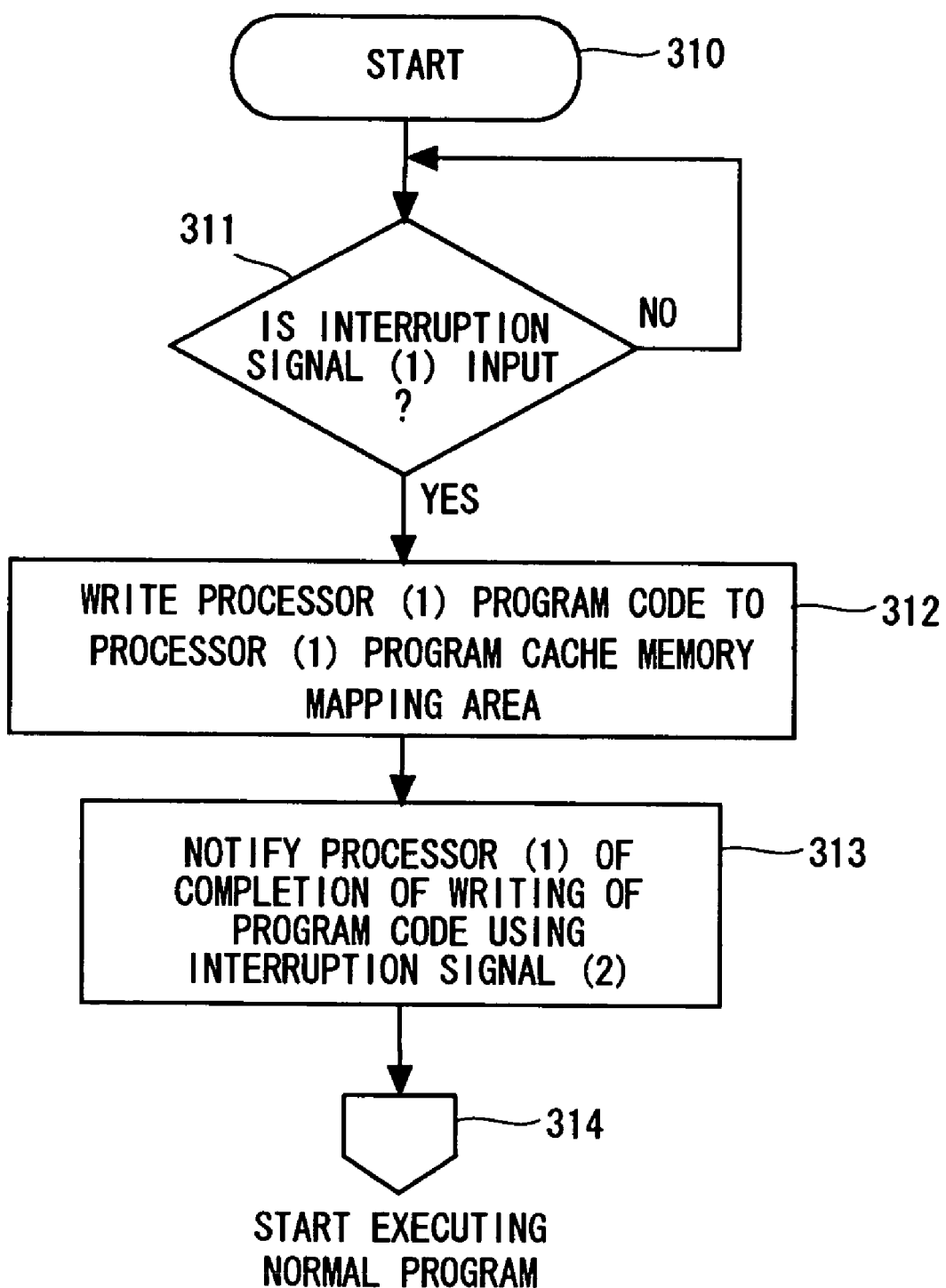
FIG. 4 is a flowchart showing a procedure of initializing the program cache memory of the data processing apparatus according to the embodiment mode of the present invention.
Figure 5:
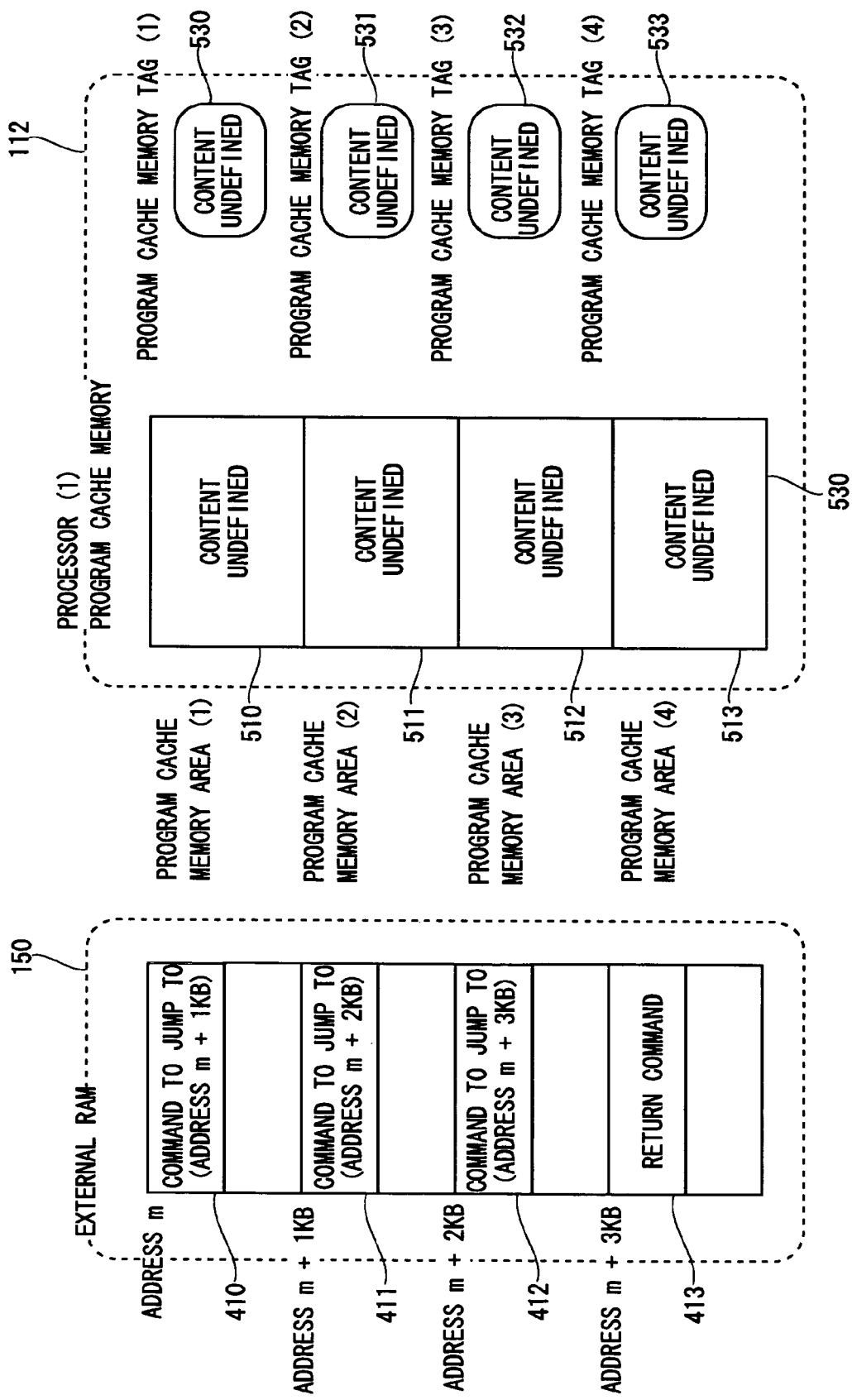
FIG. 5 shows data stored in a program cache memory in the data processing apparatus according to the embodiment mode of the present invention, when the program cache memory initializing program code is written to an external RAM.

Referring next to FIGS. 3 and 4, a procedure of initializing the program cache memory is described. FIGS. 3 and 4 are flowcharts of the procedure of initializing the program cache memory. More specifically, FIG. 3 shows an operation of the processor (1) 100, and FIG. 4 shows an operation of the processor (2) 120. First, the processor (1) 100 copies an initializing program code to initialize the program cache memory 112, and stores the copied one in the external RAM 150 (step S301). The initializing program code is stored like program codes 410, 411, 412, and 413 of FIG. 5. Incidentally, FIG. 5 shows the program cache memory 112 where four memory areas of 1 kilobyte are provided. In this case, contents of the program cache memory 112 are undefined.

Figure 6:
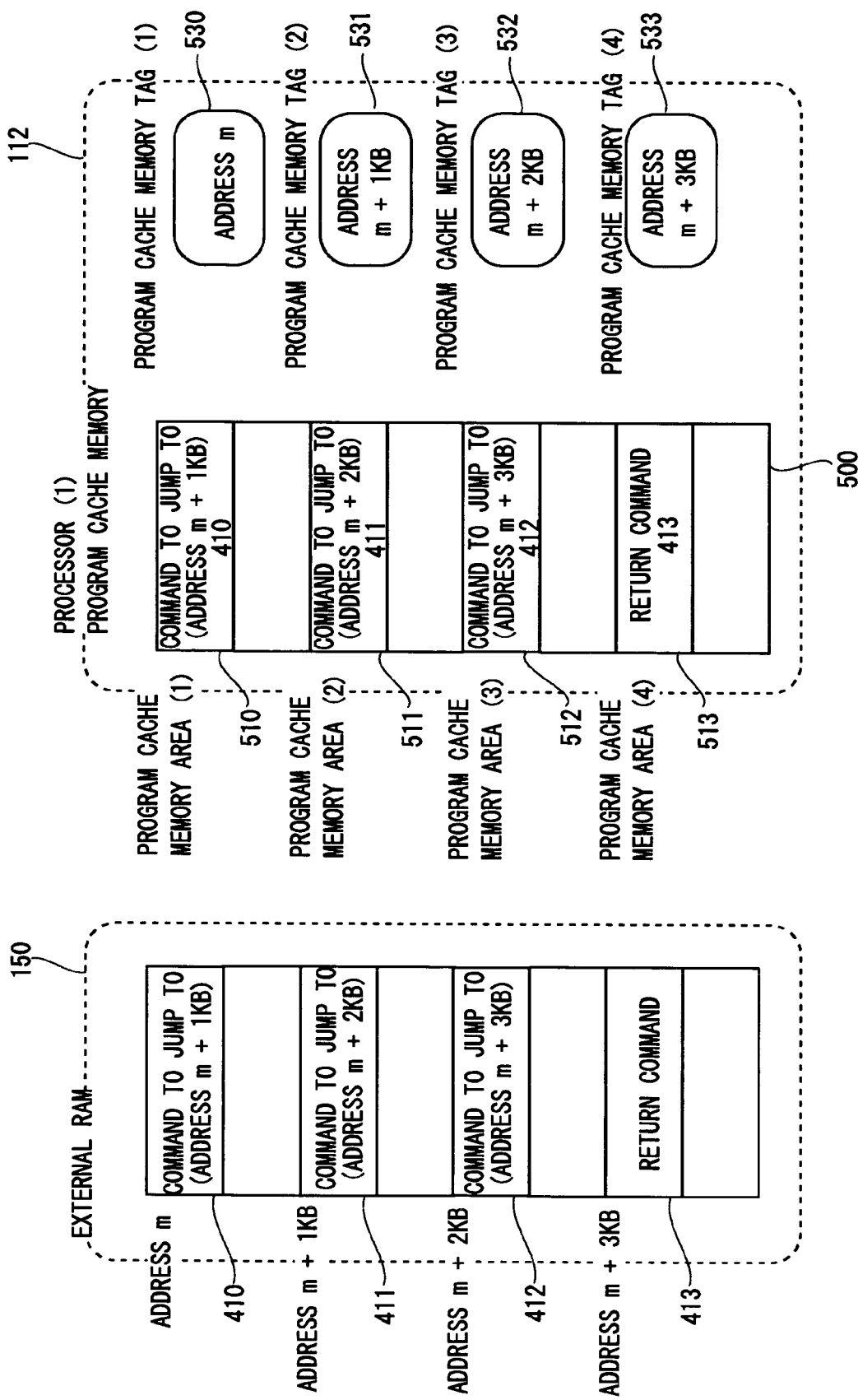
FIG. 6 shows the external RAM after execution of the initializing program and data stored in the program cache memory in the data processing apparatus according to the embodiment mode of the present invention.

Then, the above initializing program codes 410, 411, 412, and 413 stored from an address m forward are executed (step S302). During the execution of the initializing program codes, a jump of 1 kilobyte is executed three times, followed by the return to a program calling address. That is, each of the initializing program codes 410 to 412 is command to jump 1 kilobyte, and the program code 413 is a return command. Then, the processor (1) 100 executes a program fetch access to the initializing program codes 410 and 413. As a result, as shown in FIG. 6, all of 4 KB-data on the external RAM 150 from the address m are copied to the program cache memory 112 through the hardware operation of the program cache memory 112. At the same time, recorded on a program cache memory tag (1) 530, a program cache memory tag (2) 531, a program cache memory tag (3) 532, and a program cache memory tag (4) 533 is information that the program codes in memory areas of 4 KB from the address m on the external RAM 150 are copied. That is, the program cache memory tags 530 to 533 record copy source addresses on the external RAM 150 in association with the program cache memory areas 510 to 513. The tag area corresponding to a memory area to which the second processor (2) 120 writes the data among memory areas of the program cache memory 112 is associated with the address on the external RAM 150.

The processor (1) 100 notifies the processor (2) 120 of the completion of initializing the program cache memory 112 using the interruption signal (1) 140 (step S303). The processor (2) 120 waits for the interruption signal (1) 140 to input (step S311). Then, in response to the interruption signal (1), the processor (2) starts copying the program codes from the table data 210 to a program cache memory 211 of the processor (1) 100 (step S312). That is, some of the program codes are copied from the ROM 133 of the processor (2) to the program cache memory 112. In other words, codes that are not written to the internal program memory 113 out of the execution programs stored in the ROM 133 are written to the program cache memory 112. At this time, some of the program codes are written from the ROM 133 of the processor (2) to the internal program memory 113 through the DMA.

The program cache memory 112 of the processor (1) is mapped to the program cache memory 211 on the processor (2) memory map. Hence, the program codes written from the processor (2) 120 are directly written to the program cache memory 112 of the processor (1). Until this time, the processor (1) 100 has not executed the fetch access to the external RAM 150, so the program cache memory tags 530, 531, 532, and 533 are kept in the state initialized by the processor (1) 100 in step S302.

After writing the program codes to the program cache memory 112, the processor (2) 120 notifies the processor (1) 100 of the completion of writing the program codes by using an interruption signal (2) 141 (step S313). The processor (1) 100 waits for the interruption signal (2) 141 to input (step S304). In response to the interruption signal (2) 141, the processor (1) 100 is shifted to the normal program execution state (step S305). Further, after outputting the interruption signal (2) 141, the processor (2) 120 is shifted to the normal program execution state (step S314).

At this time, the program cache memory tags 530, 531, 532, and 533 of the processor (1) represent addresses on the external RAM 150. Hence, when the processor (1) 100 executes the program codes that are written by the processor (2) 120 in step S312, the processor (1) 100 can execute the program codes as if the program codes were program codes that are previously read through the program fetch from the external RAM 150 from the address m forward and written to the program cache memory 112. Accordingly, the program can be executed through the program fetch without rewriting the program cache memory 112.

As discussed above, at the time of initializing the program cache memory 112, the external RAM 150 stores the program cache memory initializing program codes 410, 411, 412, and 413, and the processor (1) 100 executes the codes. In this way, the processor (1) 100 can recognize that data stored in the program cache memory 112 of the processor (1) is identical with the program code stored in the external RAM 150. Hence, in step S312, even though the processor (2) 120 rewrites the contents of the program cache memory 112 of the processor (1) 100 afterward, the program cache memory tags 510 to 513 are not rewritten. As a result, the processor (1) 100 determines that there is no difference between the program code and the contents of the external RAM 150. Hence, the processor (1) 100 never makes a program fetch access to the external RAM 150, and executes the program code stored in the program cache memory 112. Thus, according to the present invention, it is possible to rewrite the external RAM 150 after the initialization, and the external RAM 150 can be used for other purposes.

The above description is directed to the program cache memory 112 of the processor (1) 100 composed of the four program cache memory areas 510 to 513, and the four program cache memory tags 530 to 533 with the program cache memory area being set to 1 kilobyte. However, the present invention is not limited thereto. Provided that there are x program cache memory areas and x program cache memory tags, and the size of the program cache memory area is y bytes, the present invention is applied if command storage addresses of the program cache memory initializing program codes 410, 412, 413, and 414, which are defined by the jump commands, are spaced by y bites, the number of stored commands is (x−1), and a jump width defined by the jump command is y bites.

The memory bus lines are connected such that the program cache memory 112 of the processor (1) 100 is mapped to the memory map of the processor (2) 120. Hence, the processor (2) 120 can directly write codes that are beyond the internal program memory capacity of the processor (1) 100 out of the processor (1) program codes to the program cache memory 112 of the processor (1) 100. Further, an initializing program code is used, which makes the processor (1) 100 recognize the processor (1) program codes that are written by the processor (2) 120 to the program cache memory 112 of the processor (1) 100 as program codes fetched by the processor (1) 100 from the external RAM 150. Thus, the processor (1) 100 can execute program codes without storing the program codes in the external RAM 150 after the initialization.

Further, the initializing program code represents a program for executing jump commands with a predetermined address interval on the external RAM. The program code in the external RAM 150 is written to the program cache memory 112 by the processor (1) 100 making a fetch access during the initialization. At this time, the program cache memory 112 stores the program code stored in the external RAM 150 in association with an address of the program code on the external RAM 150. Then, the processor (2) 120 rewrites only a memory area of the program cache memory 112, whereby the processor (1) 100 recognizes that data stored in the external RAM is equivalent to that of the program cache memory of the processor (1) 100.

With the above configuration, even in the case of executing a program code that is beyond the program memory capacity, it is unnecessary to increase the memory capacity of the external RAM 150. For example, in the case of executing a program code the size of which is equal to or smaller than the total capacity of the internal program memory 113 and the program cache memory 112, it is unnecessary to store the program code in the external RAM 150. Accordingly, it is possible to avoid an increase in capacity of the external RAM 150. Further, even in the case of executing a program code the size of which exceeds the total capacity of the internal program memory 113 and the program cache memory 112, it is possible to prevent substantially free space of the external RAM 150 from reducing. For example, the program fetch access to the external RAM 150 is prohibited during the execution of the program after the initialization of the program cache memory 112. Alternatively, the program fetch access to the external RAM 150 is prohibited in such a state that the processor (2) 120 writes the program to the program cache memory 112. Thus, rewriting the program cache memory 112 is prohibited. That is, even if the program code stored in the external RAM 150 is read, the program code is not written to the program cache address. This makes it possible to avoid such a situation that the capacity of the external RAM 150 increases in proportion to the capacity of the program cache memory. Hence, the free space of the external RAM 150 which is usable for other purposes can be substantially increased.

According to the present invention, in the case of executing a program code whose size is beyond the memory capacity of the internal program memory 113 embedded in the processor (1) 100, it is unnecessary to increase the internal program memory capacity of the processor (1) 100. This prevents an increase in capacity of the internal program memory 113. Further, the program code stored in the external RAM 150 occupies a smaller memory area, so the external RAM 150 can be used as a data memory or the like after the initialization. Hence, it is possible to save a development cost due to the diversion of existing processor core modules, and improve a throughput due to reduction in LSI footprint of memory module hardware.

First Embodiment

Figure 7:
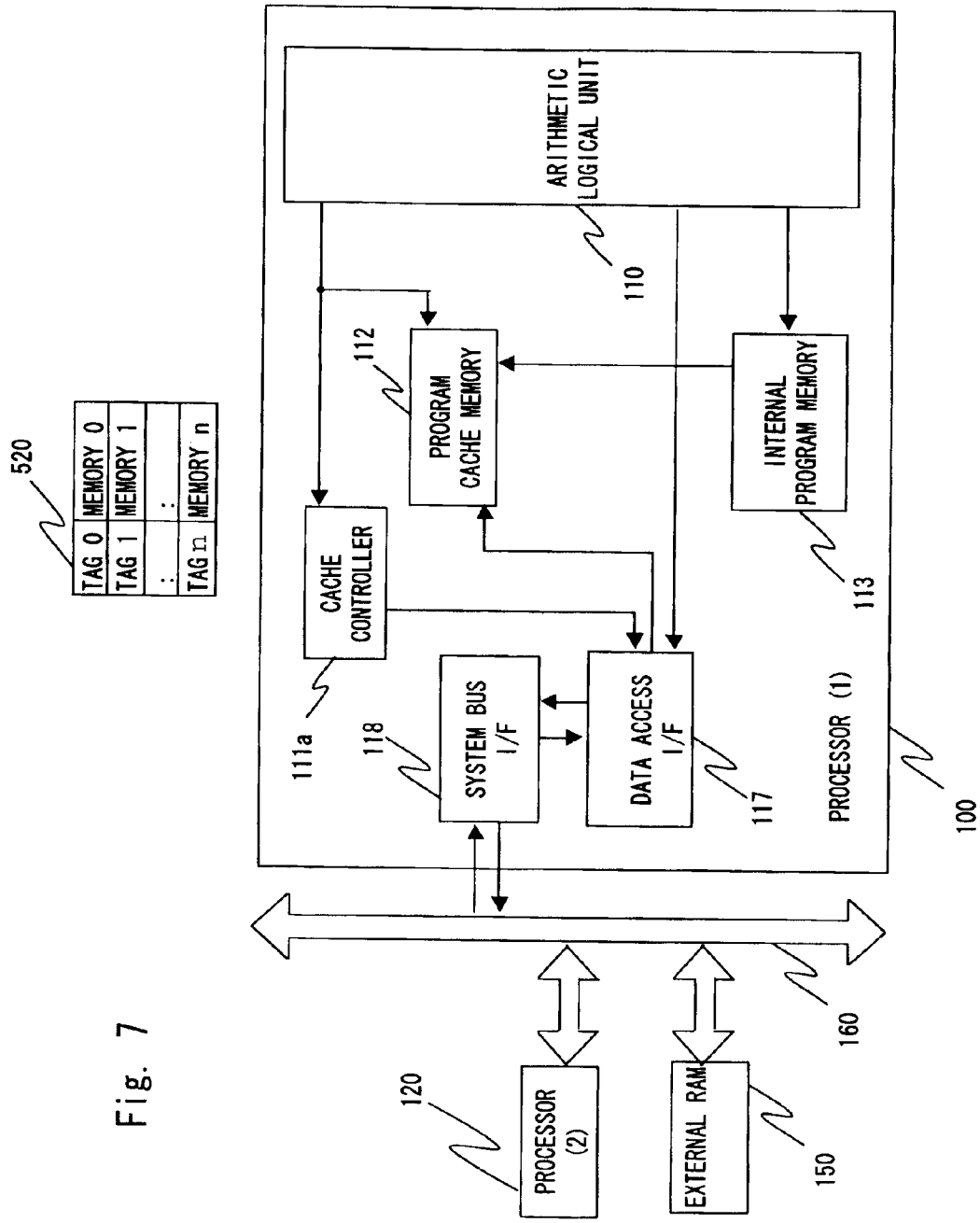
FIG. 7 is a block diagram showing the configuration of a data processing apparatus according to a first embodiment of the present invention.

Referring to FIG. 7, embodiments of the data processing apparatus according to the present invention are described. FIG. 7 is a block diagram showing the configuration of a data processing apparatus according to a first embodiment of the present invention. Incidentally, description about the same components as those of the above data processing apparatus is omitted. In FIG. 7, for ease of illustration, the inner structure of the processor (2) 120 and the configuration of the ROM 114 in the processor (1) are omitted. For clear explanation, FIG. 7 also shows the tag area 520 of the program cache memory 112.

As shown in FIG. 7, the data processing apparatus includes the processor (1) 100, the processor (2) 120, and the external RAM 150. The processor (1) 100, the processor (2) 120, and the external RAM 150 are connected via a system bus 160. The processor (1) 100 and the processor (2) 120 access the external RAM 150 or communicate with each other via the system bus 160. The processor (1) 100 and the processor (2) 120 are, for example, CPU. The processor (2) 120 is a main processor, and the processor (1) 100 is a coprocessor that operates under the control of the processor (2).

When the arithmetic logical unit 110 accesses the external RAM 150 or the processor (1) 100 communicates with the processor (2), data is transferred through a data access I/F 117 and a system bus I/F 118. The system bus I/F 118 is connected with the system bus 160, and the data access I/F 117 is connected with the system bus I/F 118. The processor (1) 110 is provided with the internal program memory 113. The internal program memory 113 stores generally used programs.

In the case of caching a program stored in the external RAM 150, the processor accesses the external RAM 150 from a cache address area. A cache controller 111a is operated thereby. The cache controller 111a constitutes a part of the memory controller 111 of FIG. 1 to control writing to the program cache memory 112. Accordingly, the cache controller 111a writes programs on the external RAM 150 to the program cache memory 112. At this time, the programs on the external RAM 150 are read through the system bus I/F 118 and the data access I/F 117. In addition, the cache controller 111a writes an address of the program read from the external RAM 150 to a memory tag of the program cache memory 112. Hence, the address on the external RAM 150 is written to the tag area 520 of the program cache memory 112. That is, the cache controller 111a writes information about which address on the external RAM 150 the program written to the program cache memory 112 is stored at, as the program cache memory tag. With this operation, the address on the external RAM 150 stored in the tag area of the program cache memory 112 is rewritten. In this way, the program cache memory tags store addresses on the external RAM 150 in association with one another.

As indicated by the tag area 520 of FIG. 7, a program stored at an address 0 of the external RAM 150 is written in association with a program cache memory tag 0. Further, a program stored at an address n of the external RAM 150 is written in association with a program cache memory tag n. In this way, the cache controller 111a associates the program cache memory tag n with the address n of the external RAM 150 as shown in FIG. 7. Based on the program cache memory tag, it is possible to determine which address corresponds to the program written to the program cache memory 112. The cache controller 111a writes an address on the external RAM to a predetermined tag of the tag area 520.

A capacity of the internal program memory 113 is limited. Thus, all programs necessary for operation cannot be stored in the internal program memory 113. To that end, the processor (2) 120 that grasps the operation of the processor (1) 100 causes the program cache memory 112 to memorize a part or all of the programs as needed. For example, if the processor (1) 100 needs to execute encoding, an encoding program is stored in the program cache memory 112. Alternatively, if the processor (1) 100 needs to execute decoding, a decoding program is stored in the program cache memory 112. Needless to say, programs other than the above programs may be stored in the program cache memory 112. Further, the program cache memory 112 may store a part of the programs.

Figure 8:
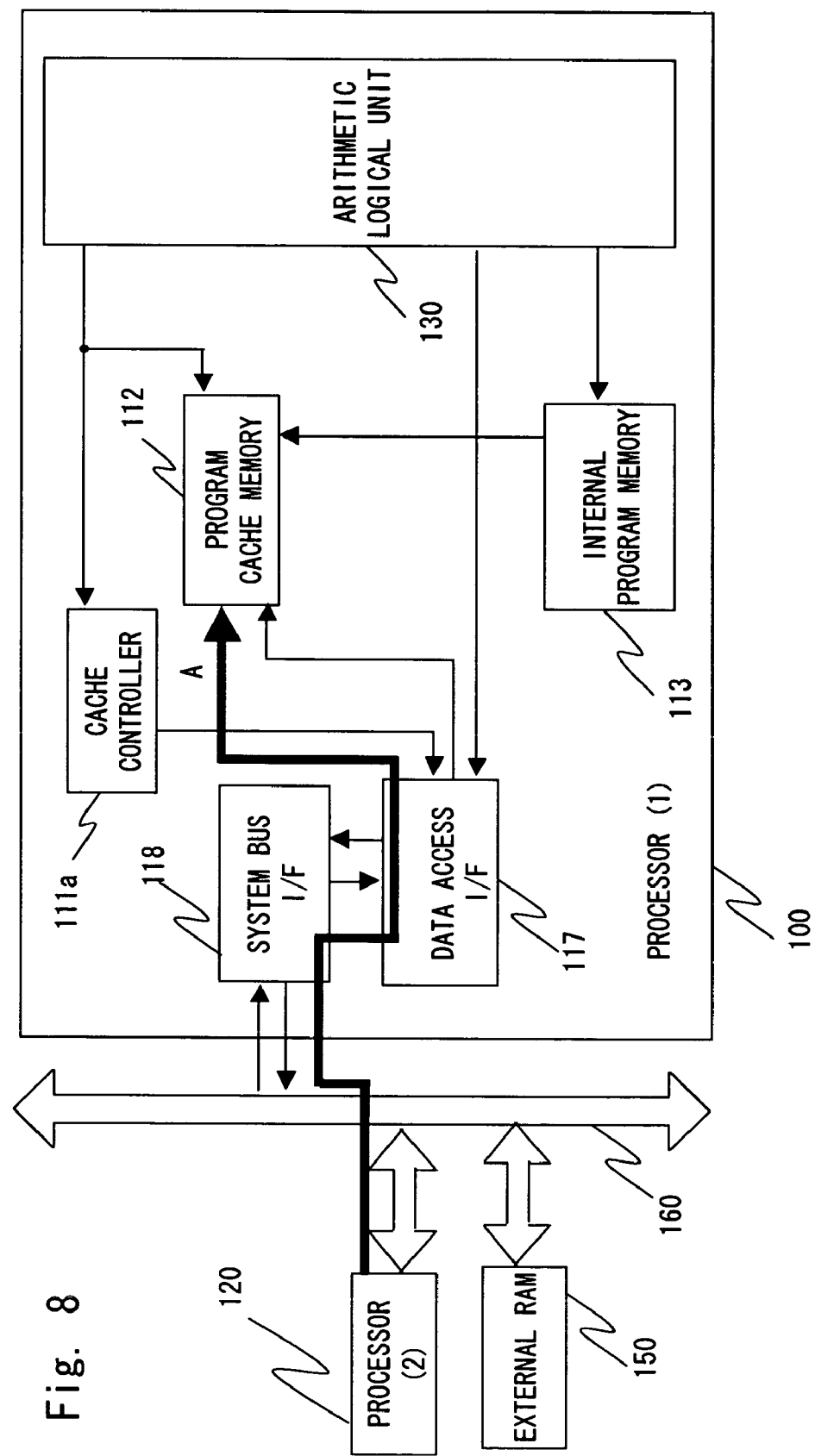
FIG. 8 shows a route for writing a program in the data processing apparatus according to the first embodiment of the present invention.

Here, the processor (2) 120 writes a program to the program cache memory 112 by a route A of FIG. 8. That is, the processor (2) 120 directly writes the program to the program cache memory 112 by way of the system bus 160, the system bus I/F 118, and the data access I/F 117. As mentioned above, the processor (2) 120 writes the program to the program cache memory 112 not through the external RAM 150. Since the cache controller 111a does not write the program to the program cache memory 112, the program cache memory tag is not rewritten. Accordingly, the address on the external RAM 150 is still written to the program cache memory tag. The cache controller 111a recognizes that the program read from the external RAM 150 is stored in the program cache memory 112. Accordingly, the arithmetic logical unit 110 executes processing as if programs in an external RAM 150 were written to the program cache memory 112 in the processor (1) 100. Hence, the processor (1) 100 does not execute program fetch access to the external RAM 150, and executes a program code stored in the program cache memory 112. Accordingly, the processor (2) 120 can make full use of the external RAM 150. Thus, it is possible to save the capacity of the external RAM 150 in accordance with the capacity of the program cache memory 112. As a result, a free capacity of the external RAM 150 which can be used for other purposes can be substantially increased.

The processor (2) 120 writes programs to the program cache memory 112 using, for example, an initializing program code including the jump command as shown in FIG. 5. More specifically, after the interruption processing as shown in FIG. 3, the processor (2) 120 writes the programs to the external RAM 150. By using the initializing program including the jump command, an address on the external RAM 150 can be associated with the program cache memory tag. That is, the processor (1) 100 associates the tag area of the cache controller 111a with the address on the external RAM 150. Here, the program cache memory 112 of the processor (1) 100 is mapped to the memory map of the processor (2) 120. Thus, programs requested by the processor (1) can be written to the program cache memory 112 of the processor (1) 100. At this time, the program is written by the route A. Then, the processor (1) uses programs written to the program cache memory 112 just like the programs in the external RAM 150. As mentioned above, by using the program including the jump command, the programs can be written by the processor (2) 120 to the program cache memory 112 in a simple manner.

Second Embodiment

Figure 9:
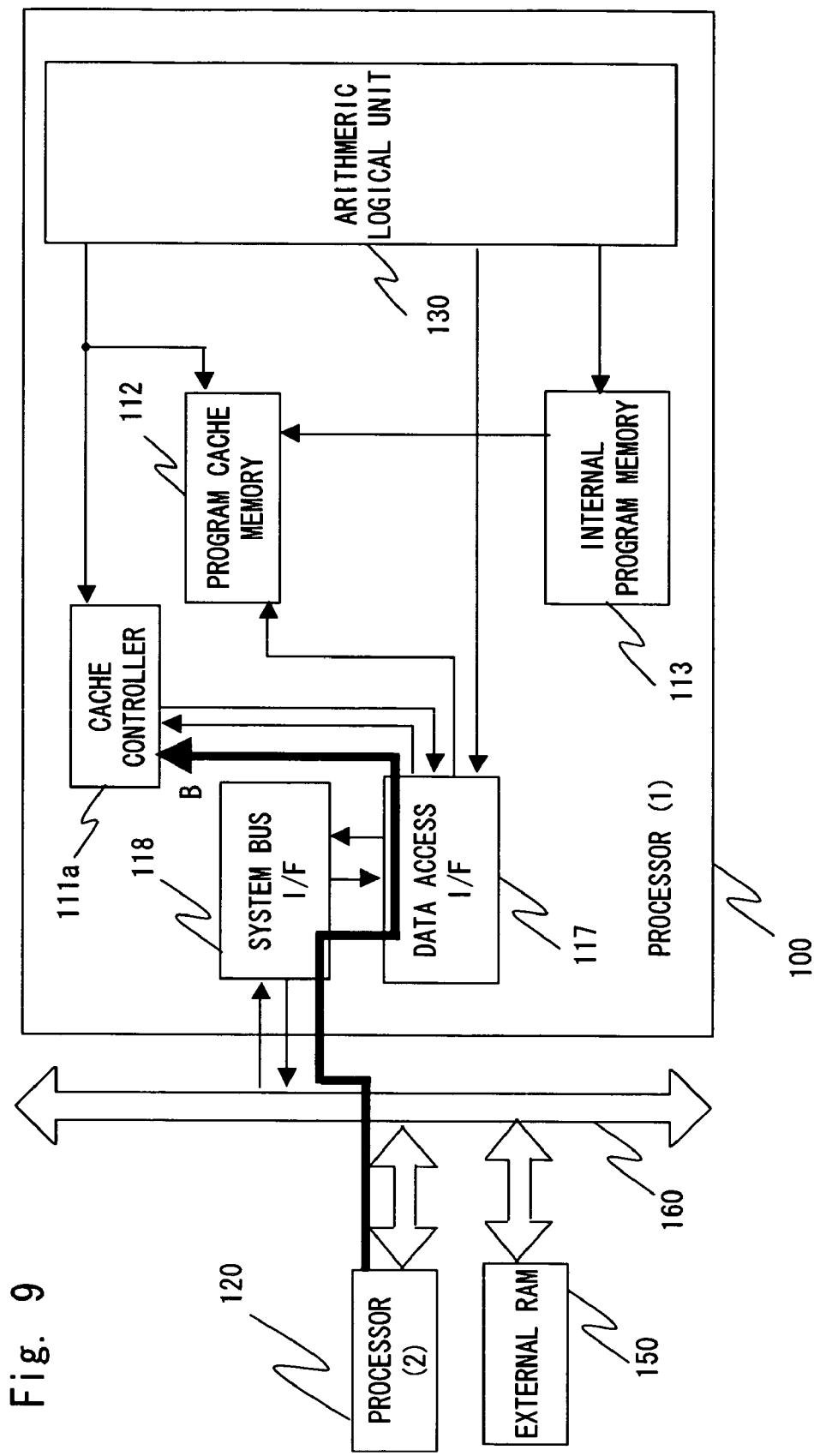
FIG. 9 shows a route for writing a program in a data processing apparatus according to a second embodiment of the present invention.

Referring to FIG. 9, the structure of a data processing apparatus according to a second embodiment of the invention is described. The basic structure of the data processing apparatus according to this embodiment is the same as that of the data processing apparatus of the first embodiment. Therefore, repetitive description about the same components as those of the above data processing apparatus is omitted. The data processing apparatus of this embodiment differs from that of the first embodiment in the route for writing the program cache memory tag. In this embodiment, when the processor (2) 120 writes programs to the program cache memory 112, the tag is written to the program cache memory 112 by a route B of FIG. 9. That is, the tag is written to the program cache memory 112 through the system bus 160, the system bus I/F 118, the data access I/F 117, and the cache controller 111a. In this way, in this embodiment, the cache controller 111a writes the tag to the program cache memory 112.

In this embodiment, data connection is established so as to allow the data access I/F 117 to write data to the cache controller 111a. Thus, the cache controller 111a can directly rewrite the program cache memory tag by the route B. Accordingly, it is unnecessary to read the program including the jump command as described in the first embodiment. That is, the cache controller 111a makes the processor (2) 120 write the program, and rewrites the program cache memory tag. At this time, the program cache memory 112 of the processor (1) 100 is mapped to the processor (2) memory map. Therefore, an address on the ROM or the internal program memory 132 of the processor (2) 120 as a program reading source is written to the program cache memory tag. Accordingly, the processor (2) 120 can make full use of the external RAM 150. Hence, similar to the first embodiment, it is possible to save the capacity of the external RAM 150 in accordance with the capacity of the program cache memory 112.

Third Embodiment

Figure 10:
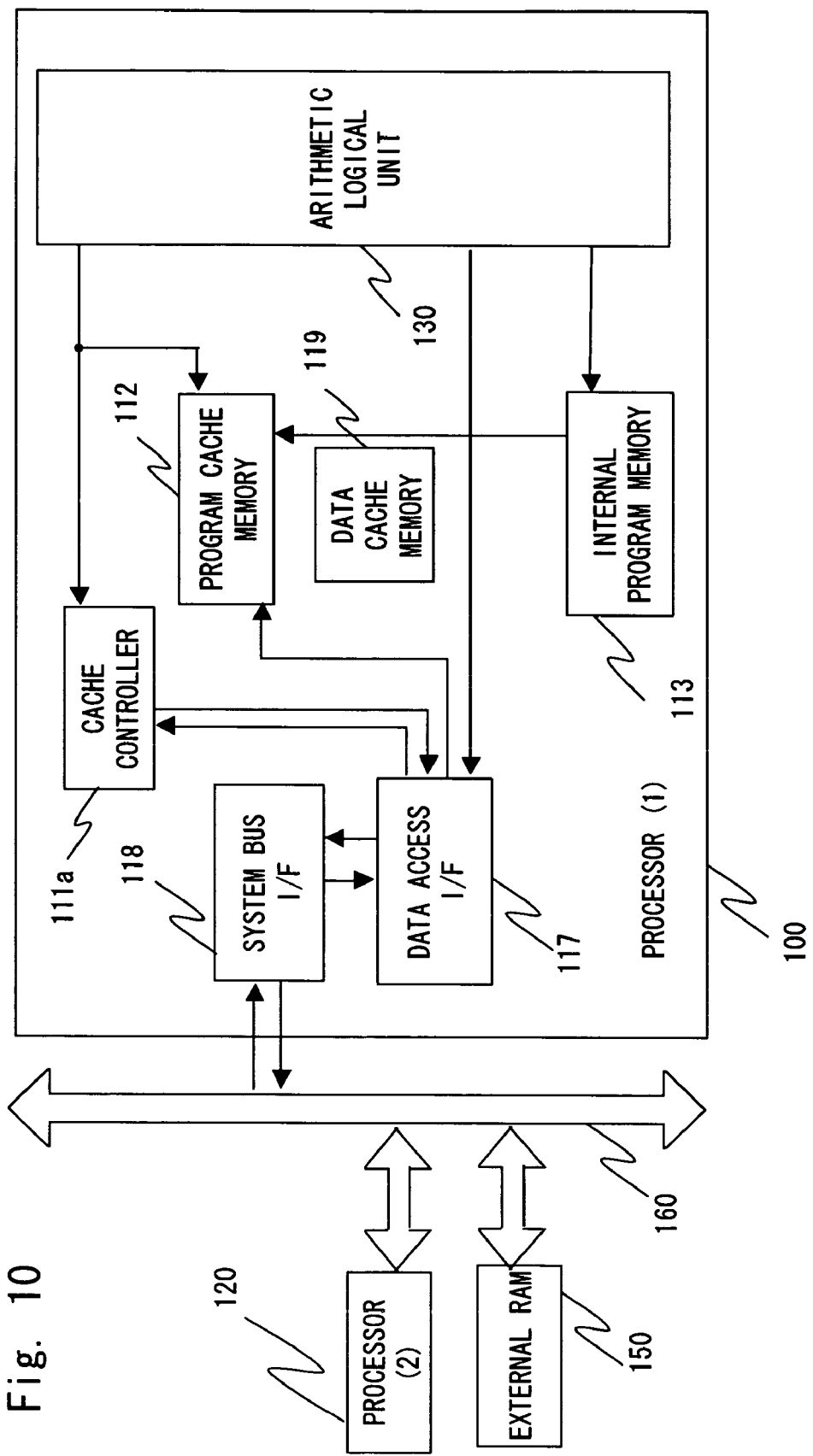
FIG. 10 shows a route for writing a program in a data processing apparatus according to a third embodiment of the present invention.

Referring to FIG. 10, the structure of a data processing apparatus according to a third embodiment of the invention is described. The basic structure of the data processing apparatus of this embodiment is the same as that of the data processing apparatus of the first embodiment. Thus, repetitive description about the same components as those of the above data processing apparatus is omitted. The processor (1) 100 of the data processing apparatus of this embodiment includes a data cache memory 119 to which data is written. The data cache memory 119 stores, for example, program data obtained by executing a program. The data cache memory 119 is also connected like the program cache memory 112. Then, the data cache memory 119 is mapped to the memory map of the processor (2) 120. Thus, the processor (2) 120 can rewrite the data cache memory 119. Accordingly, similar to the first embodiment, it is possible to save the capacity of the external RAM 150 in accordance with the capacity of the program cache memory 112. Incidentally, the data can be written to the data cache memory 119 by either the route A or route B.

As described in the embodiments of the present invention, the processor (2) 120 writes the program used in the processor (1) 100, but the present invention is not limited thereto. The processor (2) 120 may write program data. That is, various kinds of data such as a program code or program data used in the processor (1) 100 can be written by the processor (2) 120 to the cache memory. In this connection, the term data means information such as a code of a program used in the processor (1) 100, or program data obtained by executing the program. That is, data written to the program cache memory 112 by the processor (2) 120 includes a program used in the processor (1) 100 and data obtained by executing the program. Therefore, it is possible to save the capacity of the external RAM 150 in accordance with the capacity of the program cache memory 112, and to substantially increase a free space of the external RAM 150 which can be used for other purposes.

It is apparent that the present invention is not limited to the above embodiment that may be modified and changed without departing from the scope and spirit of the invention.

What is claimed is:

1. A data processing apparatus, comprising:
a first processor which executes a target program;
a second processor; and
an external RAM to/from which the first processor writes/reads data;
wherein the first processor includes:
a cache memory that stores at least a part of the target program; and
a first memory controller which controls input/output of data to/from the cache memory;
wherein the second processor includes a second memory controller which controls input/output of data directly to/from the cache memory of the first processor;
wherein the first processor initializes the cache memory so that the first memory controller accesses the cache memory without accessing the external RAM;
wherein the first processor notifies the second processor of completion of the initialization of the cache memory using a notification signal;
wherein, in response to the notification signal, the second memory controller directly writes the at least a part of the target program into the initialized cache memory of the first processor without using the first memory controller to perform said writing;
wherein the first processor executes the target program without accessing the external RAM; and
wherein initialization of the cache memory causes the first processor to execute the target program such that the first processor recognizes the at least a part of the target program that was written into the initialized cache memory of the first processor as being a program code that was fetched by the first processor from the external RAM, rather than as being a program code that was written by the second processor.

2. The data processing apparatus according to claim 1, wherein the cache memory comprises:
a memory area; and
a tag area storing a memory tag corresponding to the memory area;
wherein the initialization of the cache memory causes a source address on the external RAM to be stored in the tag area;
wherein the second processor writes the at least a part of the target program to the memory area without modifying the source address on the external RAM that is stored in the tag area.

3. The data processing apparatus according to claim 2, wherein the first processor writes an initializing program to the external RAM;
wherein the first processor executes a jump command at a predetermined address interval on the external RAM during execution of the initializing program by the first processor; and
wherein, after the first processor executes the initializing program, then the second memory controller writes the at least a part of the target program to the memory area of the cache memory.

4. The data processing apparatus according to claim 2, wherein the initialization of the cache memory causes rewriting of the memory area to be prohibited during execution of the target program.

5. The data processing apparatus according to claim 1, wherein, if the at least a part of the target program is written to the cache memory by the second processor, then the first processor is prohibited from any program fetch access to the external RAM during execution of the target program.

6. The data processing apparatus according to claim 1, wherein the first processor includes an internal program memory which stores a part of the target program, and
wherein the second processor includes a second memory which stores the rest of the target program including the at least a part of the target program that is directly written into the initialized cache memory of the first processor.

7. The data processing apparatus according to claim 6, wherein the first processor is configured to initialize the cache memory so that the first memory controller accesses the cache memory without accessing the external RAM only if a size of the target program is larger than a capacity of the internal program memory.

8. The data processing apparatus according to claim 1, wherein the first processor initializes the cache memory by using an initializing program.

9. The data processing apparatus according to claim 1, wherein the first processor includes a first memory which stores an initializing program, and
wherein the first processor initializes the cache memory by using the initializing program.

10. The data processing apparatus according to claim 1, wherein the second memory controller directly writes the at least a part of the target program into the initialized cache memory of the first processor from a memory other than a cache memory.

11. The data processing apparatus according to claim 1, wherein the second memory controller is directly coupled to the cache memory of the first processor via a dedicated memory bus line.

12. The data processing apparatus according to claim 1, wherein the second memory controller directly addresses and controls writing of the at least a part of the target program into the initialized cache memory of the first processor without using the first memory controller for any address and control of said writing.

13. The data processing apparatus according to claim 1, wherein the second memory controller comprises a program cache memory that is mapped to the cache memory of the first processor.

14. The data processing apparatus according to claim 1, wherein the initialization of the cache memory causes the first processor to execute the target program such that all program codes, of the at least a part of the target program that was written into the initialized cache memory of the first processor, are executed without storing the program codes in the external RAM after initialization.

15. A data processing method used in a data processing apparatus including a first processor which executes a target program and includes a cache memory, a second processor, and an external RAM to/from which the first processor writes/reads data, the method comprising:
initializing the cache memory, by the first processor, so that a first memory controller of the first processor accesses the cache memory without accessing the external RAM;
notifying, by the first processor, the second processor of completion of the initialization of the cache memory using a notification signal;
in response to the notification signal, directly writing, by a second memory controller of the second processor, at least a part of the target program into the initialized cache memory without using the first memory controller to perform said writing; and
executing, by the first processor, the target program without accessing the external RAM;
wherein the initializing the cache memory causes the first processor to execute the target program such that the first processor recognizes the at least a part of the target program that was written into the initialized cache memory of the first processor as being a program code that was fetched by the first processor from the external RAM, rather than as being a program code that was written by the second processor.

16. The data processing method according to claim 15, wherein the cache memory comprises:
a memory area; and
a tag area storing a memory tag corresponding to the memory area;
wherein the initialization of the cache memory comprises causing a source address on the external RAM to be stored in the tag area;
wherein directly writing comprises writing, by the second processor, the at least a part of the target program to the memory area without modifying the source address on the external RAM that is stored in the tag area.

17. The data processing method according to claim 16, further comprising:
writing an initializing program to the external RAM;
executing the initializing program by the first processor, wherein the executing of the initializing program causes a jump command to be executed at a predetermined address interval on the external RAM; and
after the first processor executes the initializing program, then writing, by the second processor, the at least a part of the target program to the memory area of the cache memory.

18. The data processing method according to claim 15, further comprising, if the at least a part of the target program is written to the cache memory by the second processor, then prohibiting the first processor from any program fetch access to the external RAM during execution of the target program.

19. The data processing method according to claim 15, wherein a first memory controller initializes the cache memory by using an initializing program.

20. The data processing method according to claim 15, wherein a first memory controller initializes the cache memory by using an initializing program which is stored in a first memory of the first processor.

21. The data processing method according to claim 15, wherein the first processor includes an internal program memory which stores a part of the target program and,
wherein the second processor includes a second memory which stores the rest of the target program including the at least a part of the target program that is directly written into the initialized cache memory, and
wherein the first processor executes the target program stored in the internal program memory and the cache memory.

22. The data processing method according to claim 21, wherein the initializing the cache memory, by the first processor, so that the first memory controller accesses the cache memory without accessing the external RAM, is performed only if a size of the target program is larger than a capacity of the internal program memory.

23. The data processing method according to claim 15, wherein the at least a part of the target program is directly written into the initialized cache memory from a memory other than a cache memory.

24. The data processing method according to claim 15, wherein the at least a part of the target program is directly written into the cache memory via a dedicated memory bus line.

* * * * *